Feb. 16, 1932.  A. M. KIVARI  1,845,024
ROTARY DRUM SCREEN
Filed June 1, 1929  2 Sheets-Sheet 1
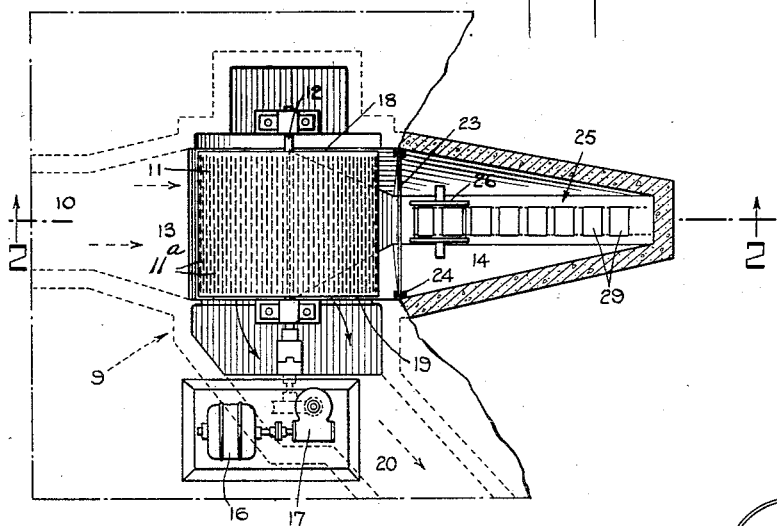
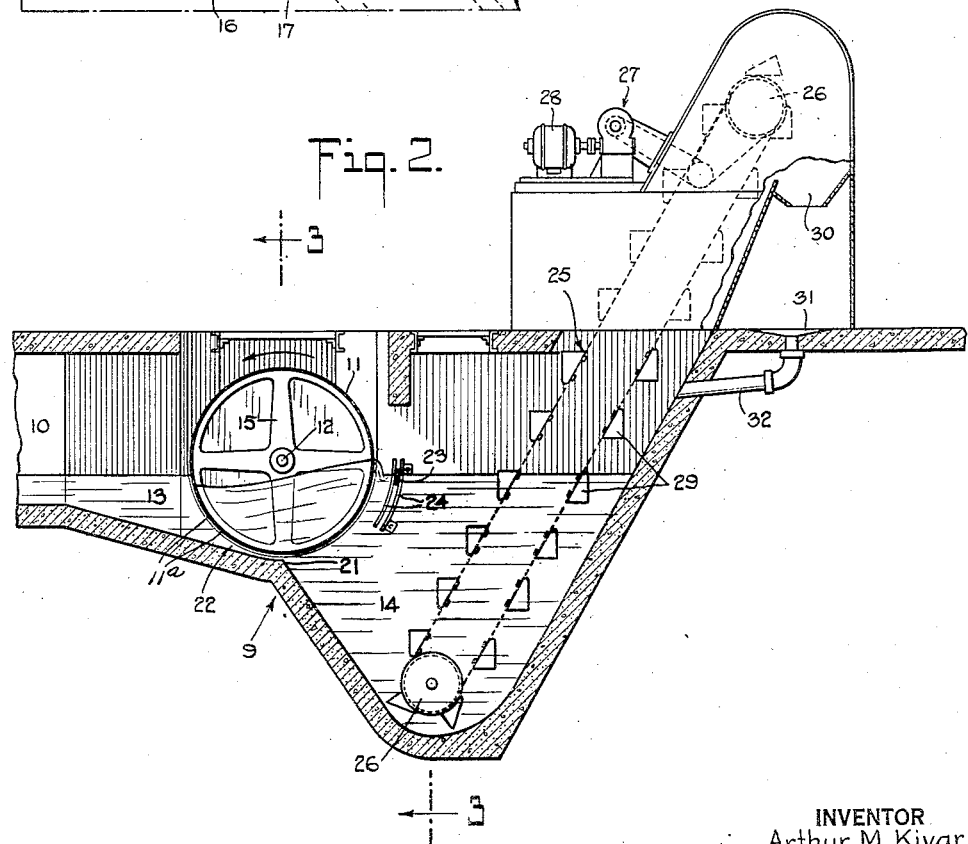
INVENTOR
Arthur M. Kivari
BY
ATTORNEY Feb. 16, 1932.  A. M. KIVARI  1,845,024
ROTARY DRUM SCREEN
Filed June 1, 1929   2 Sheets-Sheet 2
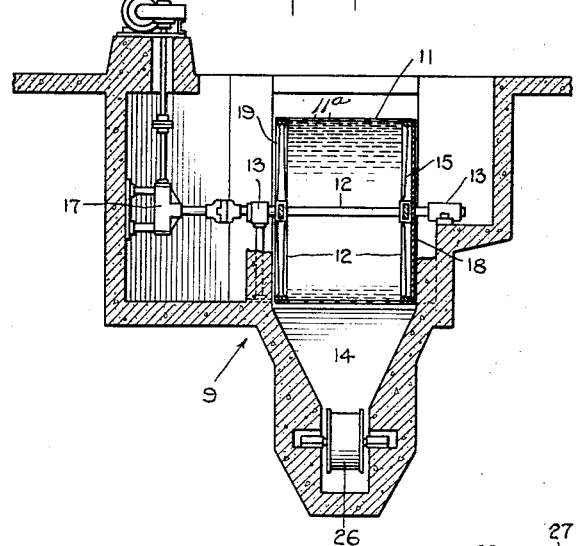
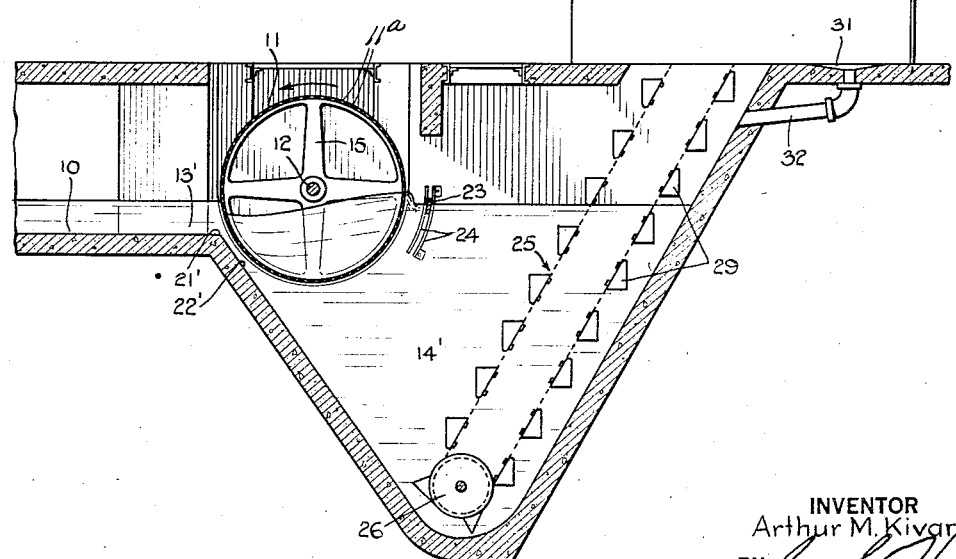
INVENTOR
Arthur M. Kivari
BY
ATTORNEY Patented Feb. 16, 1932

1,845,024

UNITED STATES PATENT OFFICE

ARTHUR M. KIVARI, OF LOS ANGELES, CALIFORNIA, ASSIGNOR, BY MESNE ASSIGN-
MENTS, TO THE DORR COMPANY, INC., OF NEW YORK, N. Y., A CORPORATION OF
DELAWARE

ROTARY DRUM SCREEN

Application filed June 1, 1929. Serial No. 367,754.

This invention is an improvement over the patent to Bachmann 1,627,550 and relates to rotary drum screen apparatus of the type ordinarily used to remove solids from trade waste waters or sewage and especially to the well known form of screen apparatus in which the screen is partially immersed or submerged in the waste, the screened liquid flowing into the screen from the side and endwise therefrom and the screened or rejected solids collecting in a sedimentation basin or settling pit.

The present invention is preferably meant for fine screening purposes and is especially directed to the removal from the screen of the solids rejected thereby, which solids generally include much that is soft and adhesive and clings readily to the outside of the screen, thereby blinding it at frequent intervals unless some provision is made to remove them from the screen surface. In very successful apparatus of this general type, such removal or stripping from the screen of the material adhering to the outside thereof, is effected by rotating the screen at such a speed as to produce a suitable cascade action at the rising or ascending side of the screen. The rotation of the screen serves to lower the liquid level within the screen at the descending side thereof and to raise the liquid level at the ascending or rising side thereof thereby providing at the ascending side of the screen a hydrostatic head which, when the screen is rotated at a suitable speed, exerts sufficient pressure on the deposit of sludge or waste solids adhering to the outer surface of the ascending side of the screen, to strip or discharge such deposit of waste material therefrom. This cascade action also tends to produce a current, flowing downwardly along the outer surface of the screen at its ascending side to assist further in removing or stripping the waste material from the screen.

In the Bachmann patent above referred to, the screen is mounted in a screen chamber and rotates about a horizontal axis. The sewage or other liquid to be screened is supplied to the screen at its descending side through a suitable influent channel or conduit and the screened or effluent liquid passes into the screen while the screened or rejected solids and some of the liquid pass beneath the screen through a restricted or shallow channel between the face of the screen and a portion of the bottom of the screen chamber curved to correspond to the curvature of the screen and terminating at the ascending side of the screen in a lip beneath the zone of cascade action and at a lower level than the low liquid level of the apparatus. Coarse or bulky solids which do not adhere to the revolving screen are ejected from said restricted or shallow passage in a suitable manner, as by means of lifting fins attached to the drum screen at the outside thereof. The upward streams of solids issuing from said lip was meant to cooperate with the downward current set up from the hydrostatic head of the cascade, so that the downward current would direct or deflect downwardly into the pit the solids issuing from the lip. This arrangement has been modified by the present improvement.

While the shallow passage forces the sewage into immediate proximity to the screen and thereby facilitates the prompt separation of the liquid from the oversize solid particles, it will be apparent that a substantial amount of excess liquid must be carried over into the settling pit, and that this liquid must escape through the screen in the comparatively restricted zone between the lip and the zone of cascade action. This arrangement likewise produces a downward flow component from the cascade, a similar downward flow carrying the oversize from the lip into the settling pit, and an upward flow of the excess liquid to the screen between the cascade and the lip.

The general object of this invention is to provide an arrangement in which the cascade zone, settling pit and influent channel are so proportioned and positioned that an increased zone is provided for the flow of liquid and finer solids through the screen from the pit without interference with the sedimentation of the solids rejected by the screen and those removed by the cascade action.

Other objects of the invention are to provide screening apparatus including a rotary screen of which the rising side projects into and is partially immersed or submerged in a sedimentation basin or screening pit which extends beneath the zone of cascade action; a screening apparatus having a rotary screen projecting into and partially submerged at its rising or ascending side in a sedimentation basin and cooperating at its descending side with a supply channel to provide a downwardly inclined channel or passage through which screened or rejected solids pass downwardly toward the bottom of the basin; and a screening apparatus in which there is a restricted inlet at the descending side of the rotary screen and which has a considerable area of screen surface at the lower part of the screen and to the rear of the zone of cascade action, submerged in the sedimentation basin to enable the flow of liquid from the basin into the tank to be distributed and thereby avoid excessive current velocity and interference with the downward flow at the cascade zone, or with the flow from the restricted passage, thereby avoiding undue disturbance of material in the relatively quiescent zone of the basin or pit.

The present invention may be carried out by using a sedimentation basin or screenings pit in connection with a rotary drum screen partially submerged at its rising side in said basin, that is, with its rising or ascending side extending forwardly of the rear end of the basin. Such an arrangement preferably with the upper edge of the rear wall of the basin adjacent to the drum screen along a line positioned to the rear of the stripping or cascade zone, provides for a relatively quiescent zone between the zone of the cascade action and the zone of discharge between the screen and the rear wall of the basin and thereby facilitates the passage into the screen of excess liquid in said basin. Preferably, the sewage supply channel includes a restricted or shallow portion adjacent to the screen, and the bottom of the restricted portion is so inclined that the material passes therefrom substantially tangentially of the screen and downwardly toward the bottom of the sedimentation basin. The rear wall of the sedimentation basin may be so inclined and positioned as to guide the waste material from the restricted portion of the channel to a deep portion of the sedimentation basin beneath the cascade zone and the sludge may be removed continuously from such low portion of the bottom of the basin, by suitable means such as a conveyer or elevator having foraminous buckets acting to dewater the collected screened solids. Suitable means, such as a floating baffle located at the rising side of the screen may be provided to control the flow at the surface of the liquid in the sedimentation basin.

According to the illustrative embodiment of the present invention, there is substantially nothing except the shallowness of the restricted passage at the descending side of the drum screen to obstruct the flow of solids into the sedimentation basin or tank inasmuch as there is a substantially continuous forward and downward inclination of the bottom of apparatus at this location, which tends to cause rejected solids to pass through the restricted passage and toward the bottom of the sedimentation basin or settling pit. Such movement of the screened solids is, of course, facilitated by the rotation of the screen which serves to produce a distinct current from the restricted passage toward the bottom of the basin. Although the passage of the larger or more bulky solids into the sedimentation basin is thus facilitated, the restriction of the passage into the sedimentation basin is sufficient to produce the desired degree of comminution of certain material which should pass into the screen and be carried therefrom by the effluent liquid for further treatment.

The provision of slotlike perforations in the drum screen is a separate feature in the scope of this invention. The shape and arrangement of the slots have a direct bearing upon the efficiency of a drum screen operated at a high rate of speed. The width of the slots controls the fineness of the screenings. Moreover when the slots are disposed longitudinally of the drum as shown, the rotary speed of the drum constitutes an additional factor of control. This is explained by the fact that a slot moves rapidly across the path of the approaching sewage liquid with the result that only relatively fine particles of the organics will pass through the slot. Due to the relative speed between the screen and the sewage liquid approaching the screen, the particles have the tendency to lodge across the slots and thus are readily discharged by subsequent cascade action. That is to say that due to the relative speeds a mechanical impurity will adjust itself lengthwise in the direction of rotation so as to lie across the slot. In other words, the very speed of the drum appears as an important factor in controlling the selectivity of the screen.

Other objects and advantages will appear upon consideration of the following description and of the accompanying drawings, forming part of this application, in which Fig. 1 is a plan view of one embodiment of my invention, partially broken away to show the underlying structure;

Fig. 2 is a vertical section on the line 2—2 of Fig. 1;

Fig. 3 is a vertical section on the line 3—3 of Fig. 2; and

Fig. 4 is a vertical section, similar to Fig. 2, of a modified form of the invention.

Referring to Figs. 1, 2 and 3 of the drawings, 9 designates a receptacle, constructed of reinforced concrete or other suitable material, having an influent or supply passage 10 through which waste liquid or sewage is supplied to the drum screen 11, rotatable on a horizontal shaft 12, and positioned with its lower portion in a screen chamber 13, which communicates at its forward end with the sedimentation basin or screenings pit 14. Both the screen chamber and the sedimentation basin are normally filled with liquid of which the level may vary a little but should not rise above that indicated in Fig. 2. The rotary drum screen has slotlike perforations 11a in suitable staggered arrangement, and 11 is mounted on shaft 12 by means of spiders 15 and rotation of the drum is effected by a motor or other source of power 16 through suitable power transmitting devices 17. One end 18 of the drum screen 11 is closed and the other end 19 is open to communicate with a discharge conduit 20 through which the effluent may pass to other apparatus for further treatment. It should be understood that a suitable seal is provided between the end 19 of the drum screen and the side wall of the apparatus to prevent solids from passing out with the screened effluent. The drum is shown to be provided with relatively narrow longitudinal slotlike perforations 11a, preferably in staggered arrangement, for the purpose of fine screening.

The screen 11 extends below the level of the influent passage or channel 10 and the bottom of the screen chamber may slope downwardly from the forward end of the influent passage 10 to a lip 21 adjacent to the lower part of the rotary screen. The slope of the bottom of the screen chamber may be such that it is substantially tangential to the outer surface of the screen and provides a shallow or restricted passage or channel 22 at its forward end adjacent to lip 21. The sedimentation basin 14 is much deeper than the screen chamber and preferably its rear wall inclines downwardly from the lip 21 to the bottom of the basin at a part substantially vertically beneath the zone of cascade action.

Upon rotation of the rotary screen in the direction indicated by the arrow in Fig. 2, the liquid level therein will be changed as indicated in this Figure and the hydrostatic head produced in this way at the ascending side of the screen will cause the liquid therein to flow outwardly and downwardly and remove or strip from the screen the rejected solids adhering thereto. The downward flow of liquid due to this cascade action will direct the solids, removed from the screen, downwardly toward the bottom of the sedimentation basin. The cascade action also tends to produce a surface current away from the drum.

It may be desirable to control further the direction of flow at the zone of cascade action. This additional control may be effected by means of a baffle 23 of suitable depth floating in the liquid and following the changes in level thereof and guided by any suitable means, such as guides 24 engaging each end of the baffle on opposite sides and so curved as to maintain the baffle at substantially the same distance from the rotary screen, irrespective of the level of water. As the screen rotates some of the liquid therein flows out of the ascending side thereof due to the hydrostatic head produced as hereinbefore described, and this flow is confined by the baffle and directed downwardly below the lower edge of the baffle. This current carries the solid particles down into the sedimentation basin to a sufficient depth to cause a suitable settling thereof.

The settling pit extends beneath the screen substantially beyond the zone of cascade action so that the solids removed by such action are projected into a central zone of the pit, avoiding any tendency to produce a current along a wall of the pit which might disturb settling in the lower part thereof, and facilitating the free separation of the coarser settling solids from the liquid without disturbance by currents from adjacent walls.

The screened solids collecting at the bottom of the sedimentation basin or pit must be removed and it is found to be particularly desirable to remove them continuously. For this purpose there is provided an elevator or conveyer 25, preferably of the endless chain type extending from the bottom of the pit upwardly and away from the rotary screen. The endless chain of the conveyer is mounted on lower and upper sprockets 26, of which the upper sprocket may be driven through suitable power transmitting mechanism 27 from a motor 28, or any other suitable source of power. Preferably the conveyer is provided with foraminous draining or dewatering buckets 29 which dip up the collected solids and permit the liquid to escape therefrom. The buckets discharge into a chute 30 in a casing enclosing the upper end of the conveyer and from which the material may be removed in any suitable manner, liquid draining from the chute 30 being collected in a shallow basin 31 beneath the chute and returned to the sedimentation basin through a pipe 32. The elevator just described and illustrated in the drawings is in general the same as elevators heretofore in use for the same purpose.

In the modified form of the invention illustrated in Fig. 4, the substantially horizontal floor or bottom of the influent channel 10 extends through the screen chamber 13′ almost to the surface of the screen 11 at the descending side thereof and terminates at an edge or lip 21′ which is also the upper edge of the rear wall of the sedimentation basin or settling pit 14′. This form may also be designed to provide a restricted passage or channel 22' between the screen 11 and the upper part of the rear wall of the basin, which rear wall may be substantially tangential to the screen at that location and slopes forwardly and downwardly to the deepest part of the pit. In other respects the structure shown in Fig. 4 may be substantially the same as that shown in Figs. 1, 2, and 3. It will be evident that in this form of the invention there is, between the cascade zone and the restricted passage 22', a relatively large area of the screen exposed to the liquid in the basin and through which the excess liquid in the basin may readily pass to the interior of the screen and out of the end thereof to the discharge conduit 20. Furthermore the restricted passage or conduit 22' is so inclined as to direct the material passing therethrough directly along the surface of said rear wall toward the bottom of the pit thereby reducing to as great an extent as is possible interference with the upward flow of liquid into the screen.

It should be understood that other advantages than those enumerated result from the particular applications of the invention, and that various changes may be made without departing from the spirit of the invention or the scope of the appended claims.

I claim:

1. An apparatus for screening sewage and the like, comprising an endwise discharging drum screen, a screenings pit, means for rotating the drum to set up therein a hydrostatic head at the rising side of the drum with respect to the liquid level in the screenings pit whereby a cascade is set up to clean adhering solids from the drum, a sewage supply channel joining said pit, said drum arranged adjacent the junction of said pit and channel so as to form with the bottom a passage for the solids, and so as to project freely into the pit in order to expose sufficient immersed screening area between said passage and the cascade zone for the return of surplus liquid from the pit into the screen.

2. An apparatus for screening sewage and the like, comprising an endwise discharging drum screen, a screenings pit, means for rotating the drum to set up therein a hydrostatic head at the rising side of the drum with respect to the liquid level in the screenings pit, whereby a cascade is set up to clean adhering solids from the drum, a sewage supply channel leading to said pit and having a bottom portion sloping continuously downwardly to said pit for the influent solids to reach the pit, said drum forming with the sloping bottom portion a passage through which to impel solids towards the bottom of the pit, and means for removing the solids from the pit.

In testimony whereof I affix my signature.

ARTHUR M. KIVARI.